March 21, 1950     T. F. BUDGE     2,501,261
MACHINE FOR UNCAPPING HONEYCOMBS
Filed April 8, 1948     4 Sheets-Sheet 3
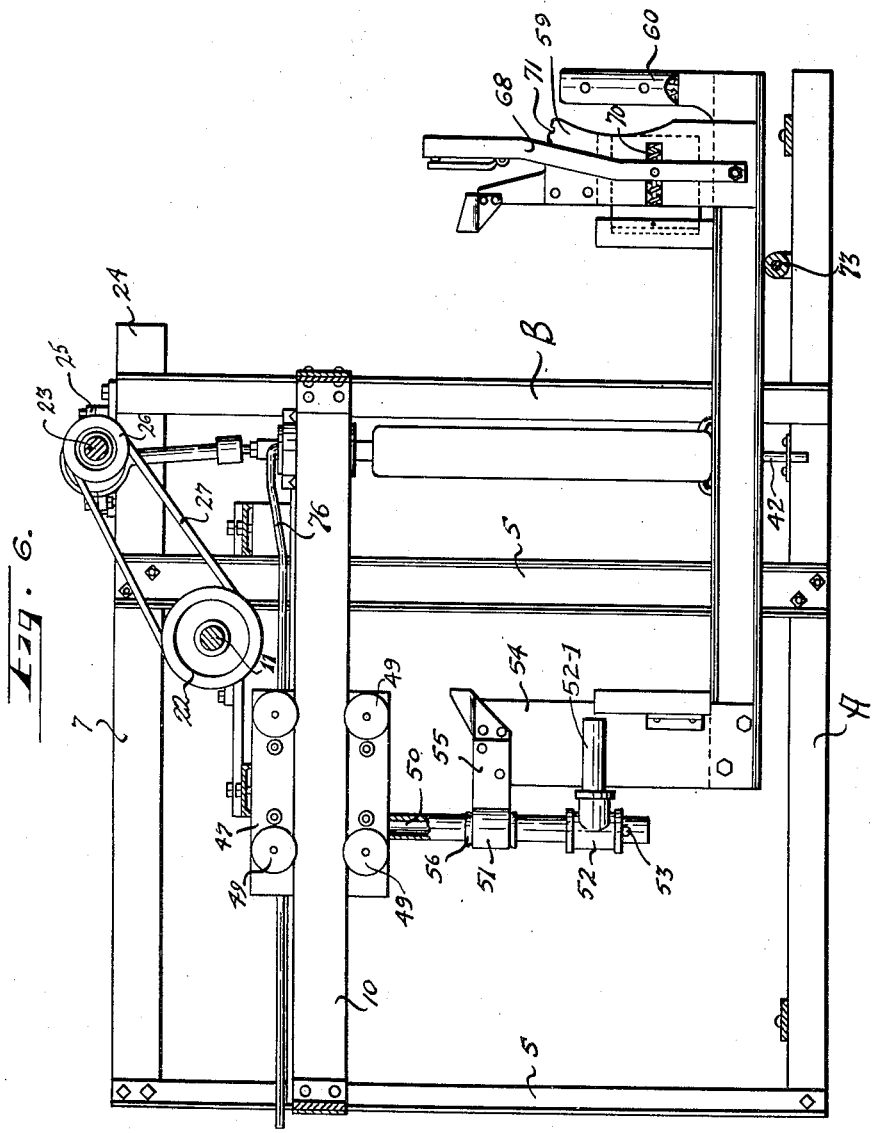
INVENTOR.
Thomas F. Budge
BY R. M. Thomas
Attorney

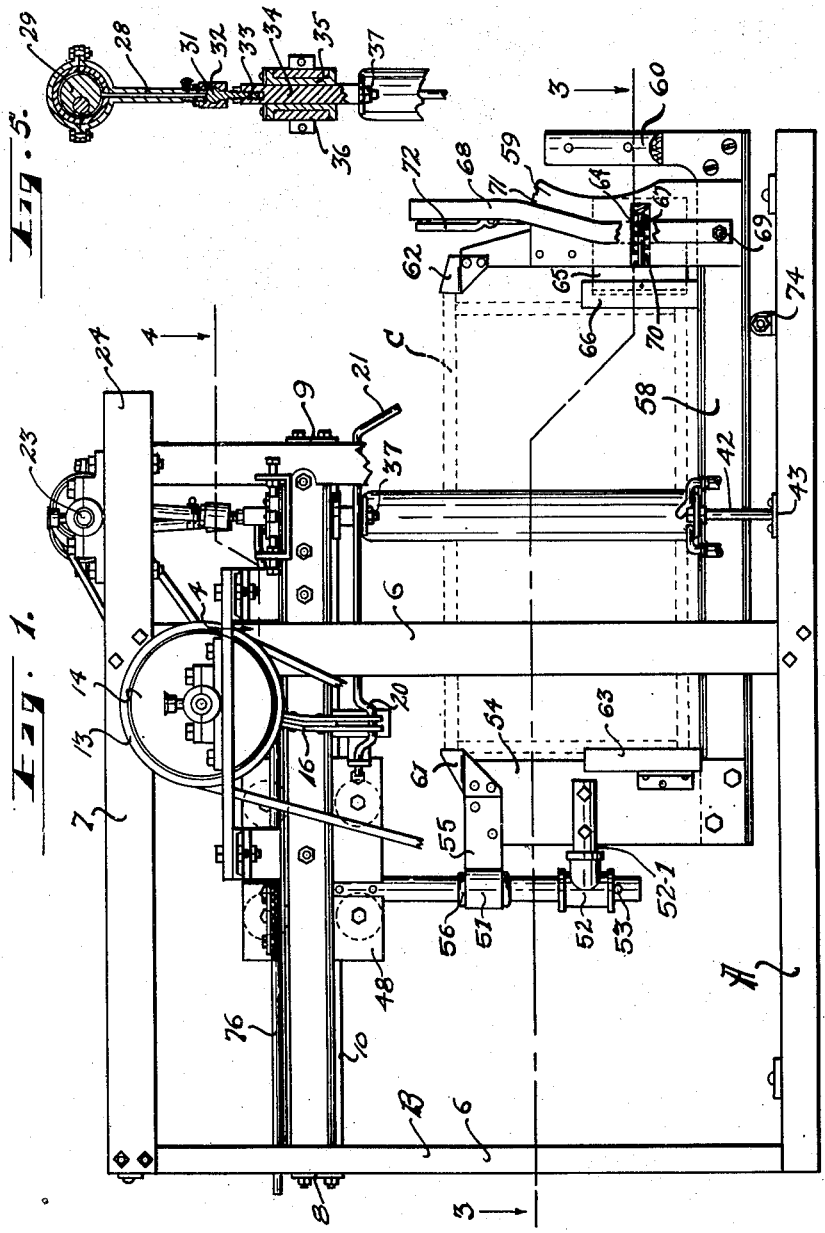

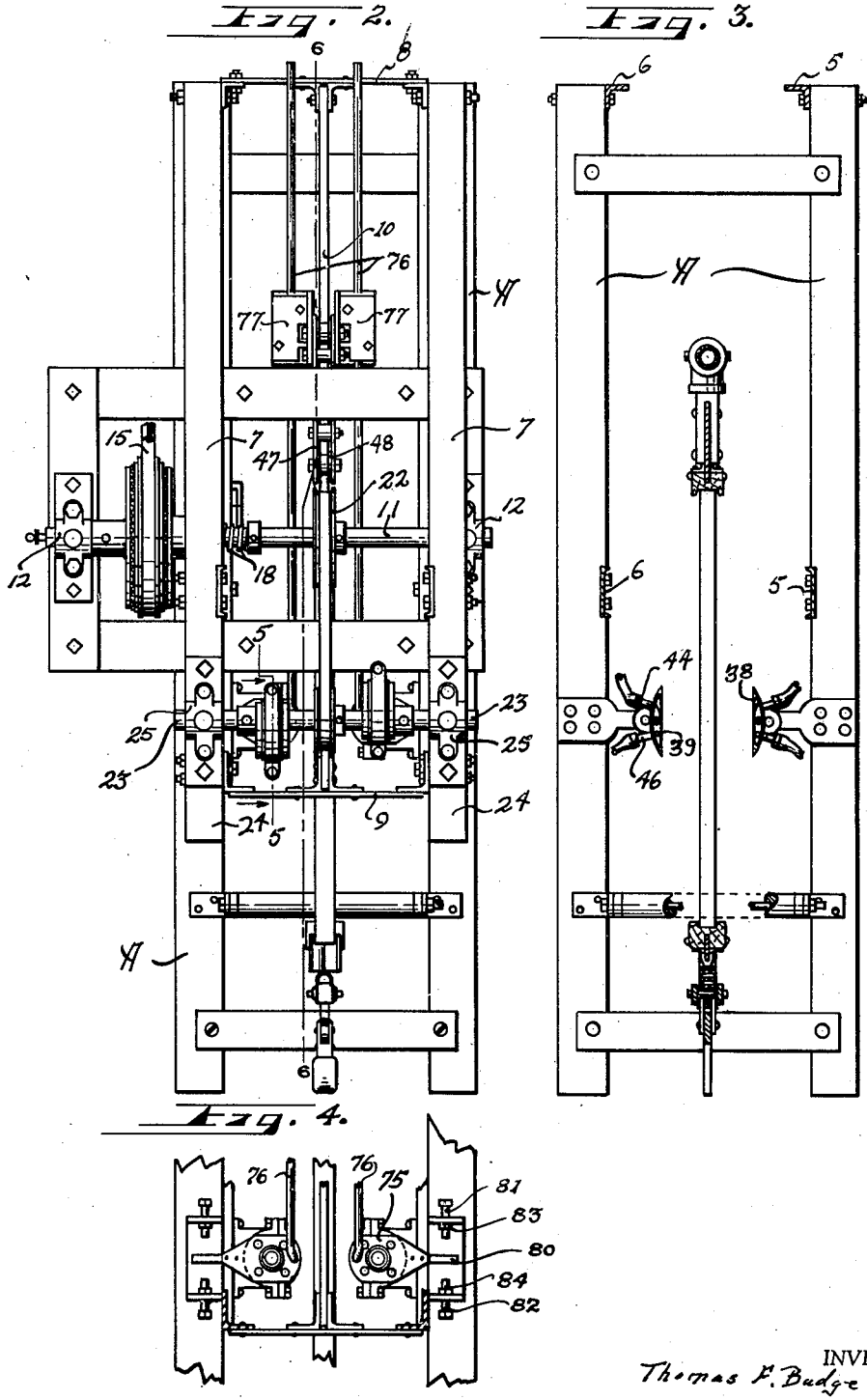

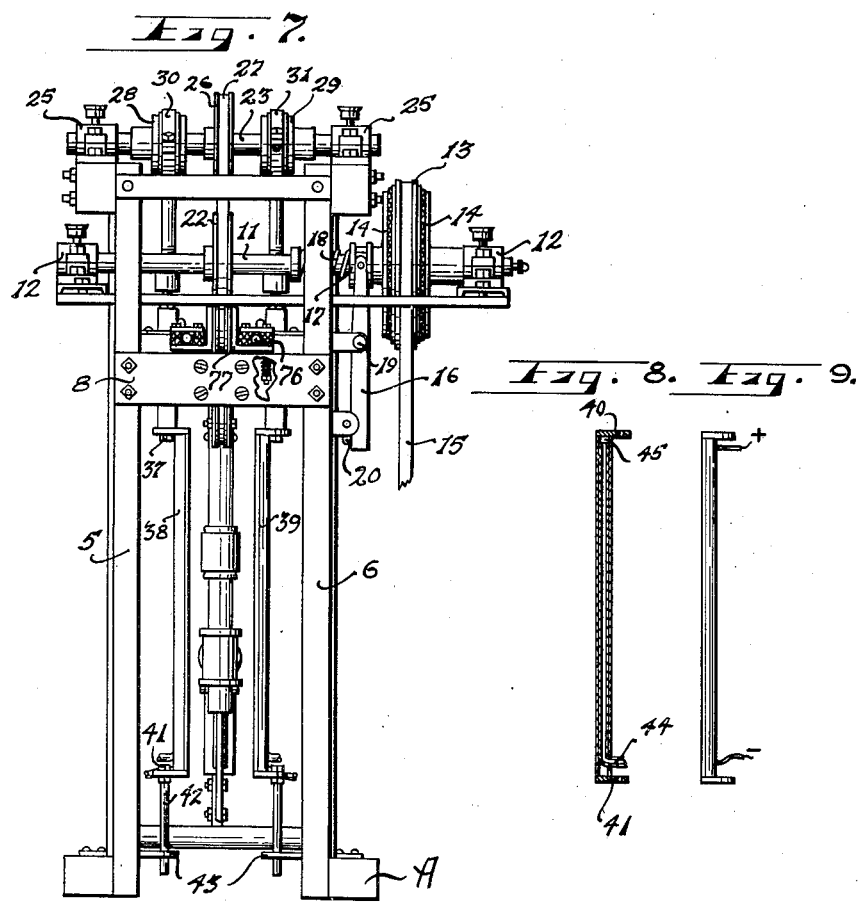

Patented Mar. 21, 1950

2,501,261

UNITED STATES PATENT OFFICE 2,501,261

MACHINE FOR UNCAPPING HONEYCOMB

Thomas F. Budge, Malad, Idaho

Application April 8, 1948, Serial No. 19,834

8 Claims. (Cl. 6—12)

This invention relates to machines for uncapping honeycombs as taken from the hive in the customary extractor frames.

The machine of the invention is manually operated, and may be described as semi-automatic. Fully automatic, power-driven machines for uncapping honeycombs are well-known. Their success in practice depends, however, on the uniformity of the honeycomb within successive honeycomb frames operated upon. No provision is made in such machines for taking care of surface irregularities or of patches of bee "brood." Yet, it is highly desirable to keep capped, patches of "brood" found within the frame, both from the standpoint of obtaining unadulterated honey and of propagation of new bees from the brood. The known types of machines uncap, uniformly, everything fed into them.

A principal object of the invention, therefore, is to provide a machine which can be operated to selectively uncap various portions, while leaving capped various other portions, of the honeycomb as an extractor frame containing the honeycomb passes through the machine.

An object is to provide a machine which, by reason of flexibility of operation, can be made to uncap honeycombs irregularly formed with respect to the honeycomb frames.

An object is to provide a machine which will uncap the honeycomb to its full length within the honeycomb frame.

A further object is to provide such a machine, wherein the important operative mechanism thereof is mounted above the honeycomb frame, free and clear of honey drip.

In accomplishing the foregoing objects, I provide a manually-operable frame-receiving carriage mounted for reciprocation between uncapping knives which are spaced apart transversely a distance sufficiently wider than the honeycomb frame that sidewise clearance is provided in cutting positions of the knives for free sidewise movement of the carriage to bring the honeycomb into and out of cutting relationship with the knives. Thus, the arrangement is such that the honeycomb can be moved sidewardly, from a neutral non-cutting position, into engagement with a cutting knife on either side. The carriage is advantageously suspended from an elevated track on a pivotal mounting permitting bodily movement of the carriage from side-to-side as well as sidewise oscillation thereof, that is to say, tilting movement from side to side, about a longitudinal axis of the carriage. Canting mechanism for the knives is positioned above the tracks free and clear of honey drip.

Further objects and features of the invention will become apparent from the following detailed description of the preferred specific form thereof illustrated in the accompanying drawings.

In the drawings:

Figure 1 is a side elevation of the machine, the driving motor being removed and part of the driving belt cut away.

Figure 2 is a plan view of the device.

Figure 3 is a section on line 3—3 of Figure 1.

Figure 4 is a section on line 4—4 of Figure 1.

Figure 5 is a section on line 5—5 of Figure 2.

Figure 6 is a section on line 6—6 of Figure 2.

Figure 7 is an end view of the entire machine.

Figure 8 is a longitudinal section of one of the cutting or uncapping knives wherein steam is employed for the heating medium.

Figure 9 is an edge view of one of the uncapping knives showing electrical wires leading thereto for heating the uncapping knives.

In the drawings I have shown the machine as mounted on a standard or base A, having a vertical rectangular framework B mounted thereon, which framework consists of side frames 5 and 6. These rectangular frames 5 and 6 have longitudinal top beams 7 extending out at one end as a support for the oscillating blades of the uncapping portion of the device. Transverse brace plates 8 and 9 space the vertical frames 5 and 6 apart and support a central elevated track 10 there-between.

Transversely across the machine I provide a drive shaft 11, Fig. 2, which shaft is mounted in bearings 12 on each end thereof, said bearings being rigidly attached to framework B. A driving sheave 13 is rotatably mounted on the shaft and is set between spaced clutch plates 14, which plates are adapted to engage the side of the sheave 13 to cause the drive shaft 11 to rotate for driving the machine. A drive belt 15 drives the sheave 13 from any suitable source of power such as an electrical motor or a portable internal combustion engine. A clutch fork 16, Fig. 7, is employed to cause the clutch plates to engage the sheave 13 when the device is to be operated. The fork 16 operates in the shifting ring 17 and a spring 18 is carried on the shaft 11 to normally hold the clutch engaged while the machine is operating. The fork 16 is pivotally mounted at 19 and the lower end of the fork is attached to a crank lever 20, Fig. 1, which crank lever is mounted in suitable brackets at one side of the machine, and has a handle 21 adapted to be partially rotated to engage or disengage the clutch mechanism as desired by the operator of the machine.

A sheave 22 is mounted on the drive shaft 11 medially between the two frameworks 5 and 6, and an eccentric shaft 23 is mounted across the top of the framework A on the extended end 24 of the top beams 7, in bearings 25. A sheave 26, Fig. 7, is mounted on the shaft 23 in alignment with the sheave 22 on the main drive shaft 11, and a belt 27 drives the sheave 26 from the sheave 22, thus imparting the rotary power motion of the shaft 11 to the shaft 23. Eccentric cranks 28 and 29 are mounted on the shaft 23 spaced outwardly from the sheave 26, and connecting rods 30 and 31 are engaged over the eccentrics 28 and 29 with the depending end of the rod provided with threads onto which a ball and socket joint is screwed.

The outer or socket member 31 of the ball and socket joint is screwed onto the shaft 28, and the ball 32 is attached to a depending shaft 33, which shaft 33 is threaded and screwed into a partially rotated reciprocating shaft 34. The shaft 34 is carried in a bearing 35 in a bearing bracket 36. The extreme lower end of the shaft 34 is internally threaded to receive a stud bolt 37, which attaches the top end of the cutting knives 38 and 39 to their respective reciprocating shafts. The cutting or uncapping knives 38 and 39 are formed with dual cutting edges—one along each vertical edge thereof, and the blades of the knives are hollow to receive a heating medium therein. The top and bottom ends of the respective blades 38 and 39, see 40 and 41, Fig. 8, are turned at right angles, and respective stud bolts 37 are inserted through perforations in the ends, 40, while respective guide bolts 42 are attached to the lower ends, 41, of the blades, with the lower ends of the bolts extending down through respective brackets 43 which are attached to the respective side frames 5 and 6. Thus, guides are provided for the lower ends of the knives.

It is noted that the knives are in transverse spaced relationship. The space between the knives is greater than the width of an extractor frame. Therefore, in order to bring a frame into cutting position, the reciprocable carriage must be manually moved over into close relationship with the knife on the particular side of the honeycomb being uncapped. To uncap the other side, the carriage is manually shifted into proximity with the opposite knife, only one side of the honeycomb being uncapped at a time.

As shown in the drawings, heating of the knives is preferably accomplished by steam. A tube 44 introduces the steam into the bottom of each knife, discharging the steam to the top interior of the knife, at 45, where the steam passes down along the cutting edges of the knife and discharges through the tube 46.

Carried longitudinally on the elevated track 10, I provide a support bracket for the forward end of the frame carrier, or carriage, which consists of spaced plates 47 and 48, which plates carry rollers 49, Fig. 6, therebetween, the rollers being grooved to fit above and below the elevated track 10 to provide a reciprocal rail support for the frame carrier. Extending down from the plates 47 and 48 there is a support tube 50, on which a sleeve 51 is carried, and spaced below the sleeve there is a T-coupling 52. The T-coupling is rotatably mounted and supported on the tube 50 by a cross pin 53. The reciprocable frame carrier or framework for receiving the extractor or honeycomb frames from the hives consists of a vertical plate 54, having the top end provided with an extended bracket 55, which is attached as an integral part of the sleeve 51. The sleeve 51 is made larger in diameter than the shaft 50, and this area is taken up by an inner sleeve 56 of sponge rubber or other yieldable, flexible material to provide not only a pivot affording, together with the T-coupling 52, bodily movement of the frame carrier from side to side about a vertical axis at the attached end of the frame carrier, but also to provide for limited sidewise movement when the frame carrier is tilted about its horizontally-disposed, longitudinal, central axis on its pivotal connection 52—1 with the T-coupling 52.

The frame carrier, shown most clearly in Figures 1 and 6, consists of the plate 54, a horizontal base 58, which is made of a channel iron and a vertical plate 59. The channel iron base 58 must of necessity be narrower than the frame or honeycomb. A handle 60 is extended beyond the plate 59 to be manually operated to move the carrier forwardly and backwardly in the machine, engaging either side of the frame being uncapped with the uncapping knife on that respective side. Sockets 61 and 62 are provided in alignment with each other with the socket 61 attached to the top end of the plate 54, and the socket 62 attached to the top end of the plate 59. These sockets 61 and 62 carry the long side or support side of the frames C shown in dotted lines in Figure 1.

An elongated socket 63 is pivotally attached near the base of the plate 54 to hold the forward end of the frame. The frame is set in the sockets 61 and 62 and is held rigidly in place by a viselike member which is mounted in the plate 59. This vise consists of a horizontal rod 64 mounted through and extending beyond the front end of a block 65 which block is pivotally attached to a wooden block 66. The block 66 is provided with a vertical channel adapted to engage the rear end of the frame. A transverse pin 67 is provided on the rod 64 which pin extends through a manual handle control lever 68, which lever is bifurcated and extended down both sides of the plate 59 and is pivoted by a bolt 69 at the bottom end thereof. A spring 70 is carried on the rod 64 and provides tension on the plate 65 and block 66. A rack 71 is formed on an extended top end of the plate 59, and is engaged by a dog, which dog is operated by the finger grip 72. An elongate support roller 73 is mounted on bracket 74 transversely of base A, and the base 58 of the frame support rides on the roller 73 as the frame is being moved forwardly and backwardly for uncapping the comb in the frame carrier.

The cutting knives for uncapping the comb in the frames are given their reciprocal motion vertically to cut the capping from the comb and at the same time they are automatically canted by limited rotation about their vertical axes, each by a plate 75, Fig. 4, which is mounted by a small screw into the flanged top end of the sleeve bearing 35. The bearing 35 carries the shaft 34 therein, and the shaft 34 is square in cross section so that partial rotation of the bearing will cause the shaft 34 to rotate the same amount, thus changing the cant of the knives with respect to the comb. The plate 75 has a hole near the perimeter thereof, and a turned down end of a shaft rod 76 is mounted therein. The rod extends back through the machine, and is engaged by a friction slippage clutch which consists of angle irons 77, sheets of fabric held in place by cover plates, and a spring for tension on the plate, thus drawing the plate down onto the fabric. The rod 76 is passed through the fabric so that the forward and backward movement of the carrier frame will cause the rod 76 to be shifted longitudinally, thereby causing the plate 75 to be partially rotated, which in turn cants the capping knives to cut against the direction of the draw of the frame thereover, so that, as the frame is drawn forwardly the blade is canted so that the rear edge is cutting, and, as the frame is pushed backwardly the blade is canted to cut in the opposite direction.

An adjustment for setting the angle of cut of the knives or blades is made by an extended limit finger 80 on one side of the plate 75, which limit finger is extended out and adapted to abut against spaced adjustment screws 81 and 82 to limit the partial rotation of the plate, and, thereby, the cutting angle of the blades or knives. Lock nuts 83 and 84 are provided on the screws 81 and 82 to lock them in the desired position for limiting the throw of the fingers 80.

The above description describes but one knife and its corresponding parts, but it is understood that there are two knives as shown and the corresponding parts of each is identical so only one has been described.

Whereas this invention is here illustrated and described with respect to a presently preferred specific embodiment thereof, it should be understood that various changes may be made therein and various other forms may be constructed on the basis of the teachings hereof, by those skilled in the art, without departing from the protective scope of the following claims.

Having thus described my invention, I claim:

1. In a machine for uncapping honeycombs, including a reciprocable carriage for the honeycomb frames, oscillating knives mounted at opposite sides of the carriage, and mechanism operable in conjunction with movement of the carriage for properly canting the knives relative to a honeycomb frame carried by the carriage, the improvement which comprises a transverse spacing of the knives sufficiently wider than the honeycomb frames to be operated upon, that sidewise clearance is provided in the cutting positions of the knives for free sidewise movement of said carriage to bring the honeycombs into and out of cutting relationship with said knives; and a manual handle control for selectively guiding movement of the carriage into and out of cutting relationship with the respective knives as the carriage reciprocates.

2. Structure in accordance with claim 1, wherein a pivotal mounting supports the reciprocable carriage at one end thereof for reciprocation, and wherein the manual control handle is secured to the opposite end of the carriage.

3. Structure in accordance with claim 2, wherein the machine embodies a structural framework having an elevated track; and supporting means mounted on said track for reciprocative movement therealong, said supporting means depending from the track and having the reciprocable carriage pivoted to its depending end so that the honeycomb frame is positioned below said track.

4. Structure in accordance with claim 3, wherein the knives-canting mechanism of the machine is disposed above the said track.

5. Structure in accordance with claim 4, wherein the knives-canting mechanism comprises linkage elements secured at the upper ends of the respective knives, and having respective limit fingers extending therefrom; sets of spaced abutments associated with said respective limit fingers, for determining the extent of canting movement of the knives; a pair of linkage rods pivotally secured to the respective linkage elements, and extending longitudinally of the reciprocable carriage; and friction slippage clutches secured to the carriage supporting means, said clutches frictionally engaging the respective linkage rods for sliding movement therealong when the carriage is reciprocated and the limit fingers of the corresponding linkage elements are in abutting position.

6. Structure in accordance with claim 5, wherein the depending portion of the carriage supporting means is a shaft; a pivot connection between the lower part of the carriage and the shaft, affording sidewise oscillating movement for the carriage in its reciprocation between the knives; and an articulative connection between the upper part of the carriage and the shaft, said connection comprising a sleeve concentric with the shaft but of greater diameter, providing clearance for relative transverse oscillation, and a yieldable elastic sleeve insert concentric with said sleeve and shaft and filling said clearance.

7. Structure in accordance with claim 6, wherein an elongate, transverse roller supports the free end of the carriage.

8. Structure in accordance with claim 1, wherein a pivotal mounting supports the reciprocable carriage at one end thereof, said pivotal mounting comprising a pivot having a substantially vertical axis, affording bodily movement of said carriage from side-to-side, and a pivot having a substantially horizontal axis, affording side-to-side tilting movement for the reciprocable carriage.

THOMAS F. BUDGE.

REFERENCES CITED

The following references are of record in the file of this patent:

UNITED STATES PATENTS

| Number | Name | Date |
| --- | --- | --- |
| 1,779,469 | Gran | Oct. 28, 1930 |
| 2,272,808 | McFadyen | Feb. 10, 1942 |